United States Patent
Mukohjima

[11] Patent Number: 5,402,030
[45] Date of Patent: Mar. 28, 1995

[54] VIBRATION WAVE DRIVEN APPARATUS

[75] Inventor: Hitoshi Mukohjima, Yokohama, Japan

[73] Assignee: Canon Kabushiki Kaisha, Tokyo, Japan

[21] Appl. No.: 917,742

[22] Filed: Jul. 23, 1992

Related U.S. Application Data

[63] Continuation of Ser. No. 627,024, Dec. 13, 1990, abandoned.

Foreign Application Priority Data

Dec. 13, 1989 [JP] Japan ................... 1-323329

[51] Int. Cl.⁶ ............................................. H01L 41/08
[52] U.S. Cl. ........................................ 310/323
[58] Field of Search .......................... 310/323, 328

[56] References Cited

U.S. PATENT DOCUMENTS

| | | | |
|---|---|---|---|
| 4,580,073 | 4/1986 | Okumura et al. | 310/323 |
| 4,692,650 | 9/1987 | Okumura et al. | 310/323 |
| 4,692,651 | 9/1987 | Hiramatsu et al. | 310/323 |
| 4,752,711 | 6/1988 | Tsukimoto et al. | 310/323 |
| 4,768,256 | 9/1988 | Motoda | 310/323 X |
| 4,771,203 | 9/1988 | Mukohjima et al. | 310/323 |
| 4,779,019 | 10/1988 | Onishi et al. | 310/323 |
| 4,882,500 | 11/1989 | Iijima | 310/323 |
| 5,079,470 | 1/1992 | Kasuga et al. | 310/323 |
| 5,148,068 | 9/1992 | Kushida et al. | 310/323 X |

FOREIGN PATENT DOCUMENTS

| | | |
|---|---|---|
| 60-16781 | 3/1985 | Japan . |
| 62-260567 | 11/1987 | Japan . |
| 0136985 | 6/1988 | Japan ................... 310/323 |
| 0190569 | 8/1988 | Japan ................... 310/323 |
| 0107678 | 4/1989 | Japan ................... 310/323 |
| 0218367 | 8/1989 | Japan ................... 310/323 |
| 0070277 | 3/1990 | Japan ................... 310/323 |

*Primary Examiner*—Mark O. Budd
*Attorney, Agent, or Firm*—Fitzpatrick, Cella, Harper & Scinto

[57] ABSTRACT

In a vibration motor in which an electro-mechanical energy conversion element which is periodically deformed is joined to an elastic member to constitute a vibration member, a travelling vibration wave is generated in the vibration member, and the vibration member and a contact member which is urged against the vibration member are relatively moved by the vibration wave, a plurality of contact portions are formed on a portion of the elastic member on a driving side at predetermined intervals, and when the contact portions are engaged with the contact member, the relative movement between the vibration member and contact member is caused by the vibration wave.

14 Claims, 7 Drawing Sheets

VIBRATION WAVE DRIVEN APPARATUS

This application is a continuation of application Ser. No. 07/627,024, filed Dec. 13, 1990, now abandoned.

BACKGROUND OF THE INVENTION

1. Field of the Invention

The present invention relates to a vibration wave motor utilizing a travelling vibration wave.

2. Related Background Art

A vibration wave motor utilizes, in its driving operation, a vibration energy generated when a frequency voltage is applied to, e.g., a piezo-electric element. The vibration wave motor has a simple and compact structure as compared to a conventional electro-magnetic motor since it requires no windings, and can obtain a large torque at a low rotational speed. The vibration wave motor is also called an ultrasonic wave motor, and a motor which generates a vibration wave as a travelling wave is put into practical applications as, e.g., a motor for driving an auto-focus lens of a single-reflex lens.

The principle of the driving operation of this travelling wave type vibration motor is known to those who are skilled in the art, as disclosed in, e.g., Japanese Laid-Open Patent Application No. 62-260567. That is, AC voltages having different phases as a function of time are applied to driving piezo-electric elements of two phases, i.e., A and B phases having different spatial phases, thereby exciting standing waves having a phase difference of 90° in an elastic member to which the piezo-electric elements are bonded. These standing waves are synthesized to form a travelling wave. A moving member urged against the elastic member is frictionally driven by this travelling wave.

FIG. 6 is a sectional view of a conventional travelling wave type vibration wave motor.

In FIG. 6, known piezo-electric elements 11a are adhered to a bottom surface of a ring-shaped elastic member 11 mainly formed of a metal, thus constituting a vibration member. A plurality of projections 11b are formed on the elastic member to increase an amplitude of vibration in a feed direction.

A ring-like moving member 2 is urged against the upper surface of the elastic member 11, and has a frictional member 2a, an anti-vibration member 2b, an anti-vibration member receiving member 2c, and a bearing member 2d. An end portion of the frictional member 2a is in contact with the upper surface of the elastic member 11, and the anti-vibration member 2b contacting the frictional member 2a is formed of an elastic material such as butyl rubber having good vibration damping characteristics.

The anti-vibration member receiving member 2c is also a ring-like metal member, and is fixed to the ring-like bearing member 2d by a screw 2e.

A fixing portion 3 rotatably holds the moving member 2 using bearing members 4 and 5 through balls 15.

The other surface of the elastic member 11 contacts a pressing ring 9 via a vibration insulating member 6 such as felt, a holding plate 7, and a belleville spring 8 for urging the elastic member 11 against the moving member 2.

Note that the operation of the vibration wave motor for moving the moving member 2 by a travelling vibration wave generated in the elastic member 11 is basically the same as those of motors according to applications before the present application, and a detailed description thereof will be omitted.

In the prior art, however, since an amplitude of a vibration wave generated in the elastic member 11 is at most several microns, the flatness of a contact portion between the elastic member 11 and the frictional member 2a must be as large as the amplitude, resulting in an increase in working cost. If the contact portion has a poor flatness, contact states at opposing positions between the elastic member 11 and the frictional member 2a are considerably varied, resulting in a large rotation nonuniformity, and large noise.

SUMMARY OF THE INVENTION

It is an object of the present invention to provide a vibration wave motor which can solve the conventional problems, can obtain reliable contact states without requiring a high-precision flatness, and is free from rotation nonuniformity and generation of noise.

It is another object of the present invention to provide an inexpensive vibration wave driven apparatus.

The above and other objects of the present invention will be apparent from the following detailed description of the present invention.

In order to achieve the above objects, according to the present invention, there is provided a vibration wave motor in which an electro-mechanical energy conversion element which is periodically deformed is joined to an elastic member to constitute a vibration member. A travelling vibration wave is generated in the vibration member, and the vibration member and a contact member which is urged against the vibration member are relatively moved by the vibration wave. Specifically, a plurality of contact portions are formed on a portion of the elastic member on a driving side at predetermined intervals, and when the contact portions are engaged with the contact member, a relative movement between the vibration member and contact member is caused by the vibration wave.

DETAILED DESCRIPTION OF THE PREFERRED EMBODIMENTS

Figure 1:
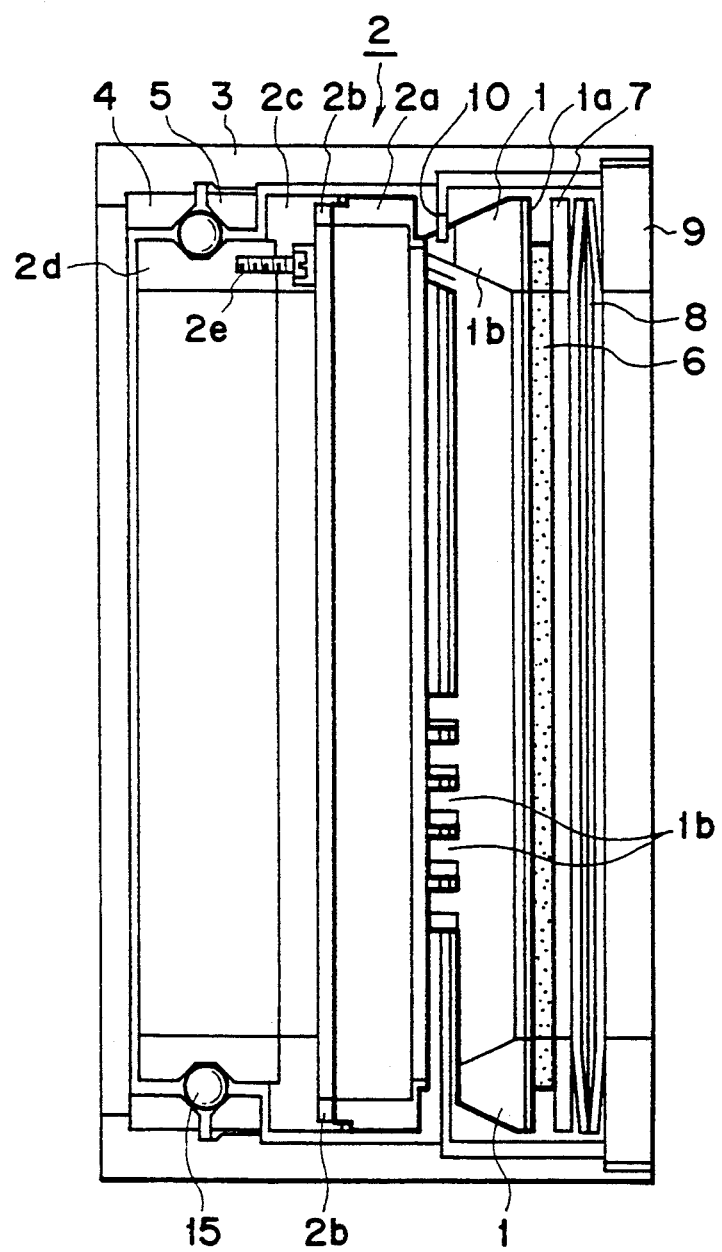
FIG. 1 is a sectional view showing of a vibration wave motor according to an embodiment of the present invention.
Figure 2:
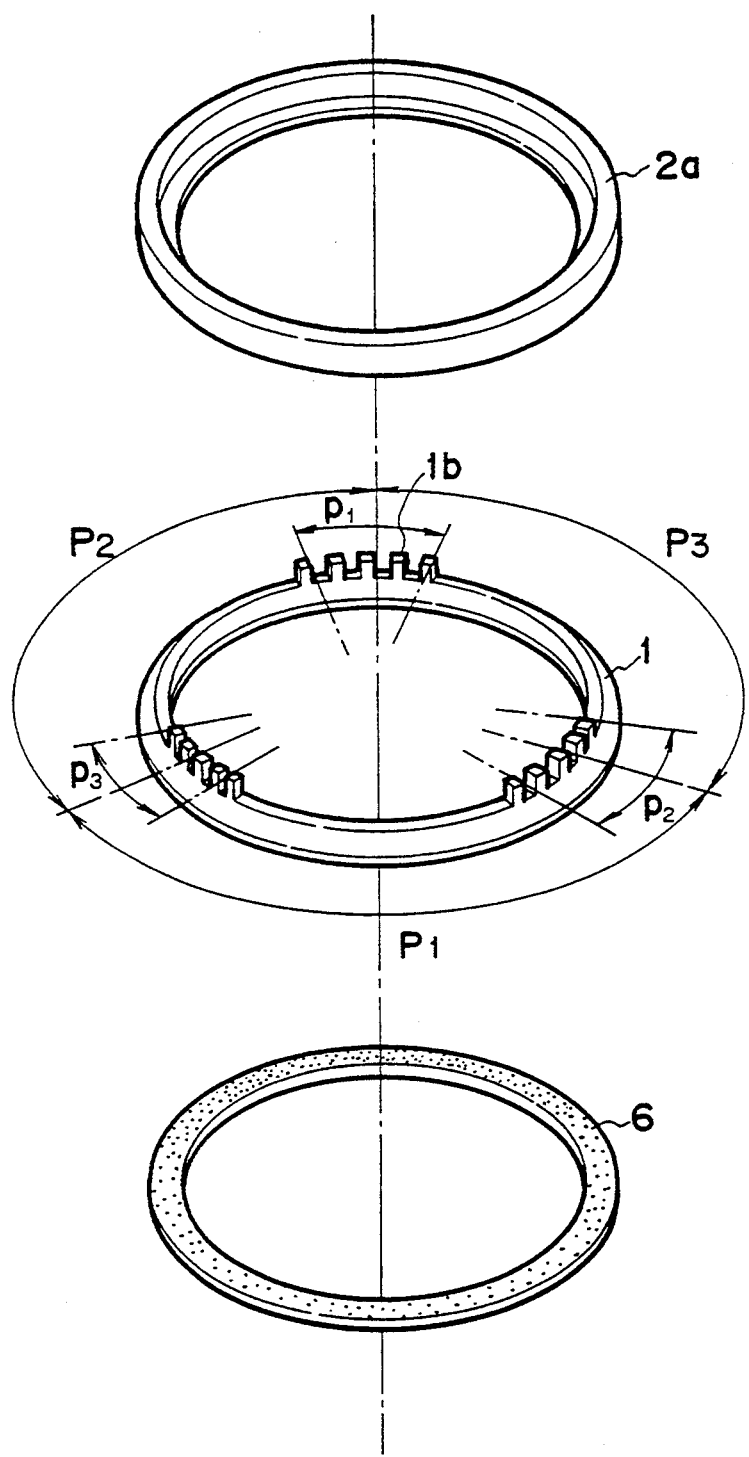
FIG. 2 is an exploded perspective view of a vibration member and its peripheral members of the motor shown in FIG. 1.

FIG. 1 is a sectional view showing of a vibration wave motor according to an embodiment of the present invention, and FIG. 2 is an exploded perspective view of a vibration member and its peripheral members of the motor shown in FIG. 1. In this embodiment, the same reference numerals denote the same parts as in the prior art, and a detailed description thereof will be omitted.

Piezo-electric elements 1a including two groups, i.e., A and B phases of driving piezo-electric elements are adhered to a bottom surface of an annular elastic member 1 by, e.g., adhesive. Projection groups, each of which includes a plurality of (five in this embodiment) projections 1b are formed at a plurality of positions (three positions in this embodiment) at angular intervals of pitches $P_1$, $P_2$, and $P_3$ in a circumferential direction on a driving side, i.e., a side contacting a frictional member 2a of the elastic member 1. Note that the plurality of projections 1b in each projection group are present within a corresponding one of circumferential pitches $p_1$, $p_2$, and $P_3$.

In this embodiment, a travelling wave formed in the elastic member 1 is assumed to be a $\tau$ wave, and the circumferential pitches $P_1$, $P_2$, and $P_3$ of the projection groups coincide with a wavelength $\lambda$ of the travelling wave.

Figure 3A:
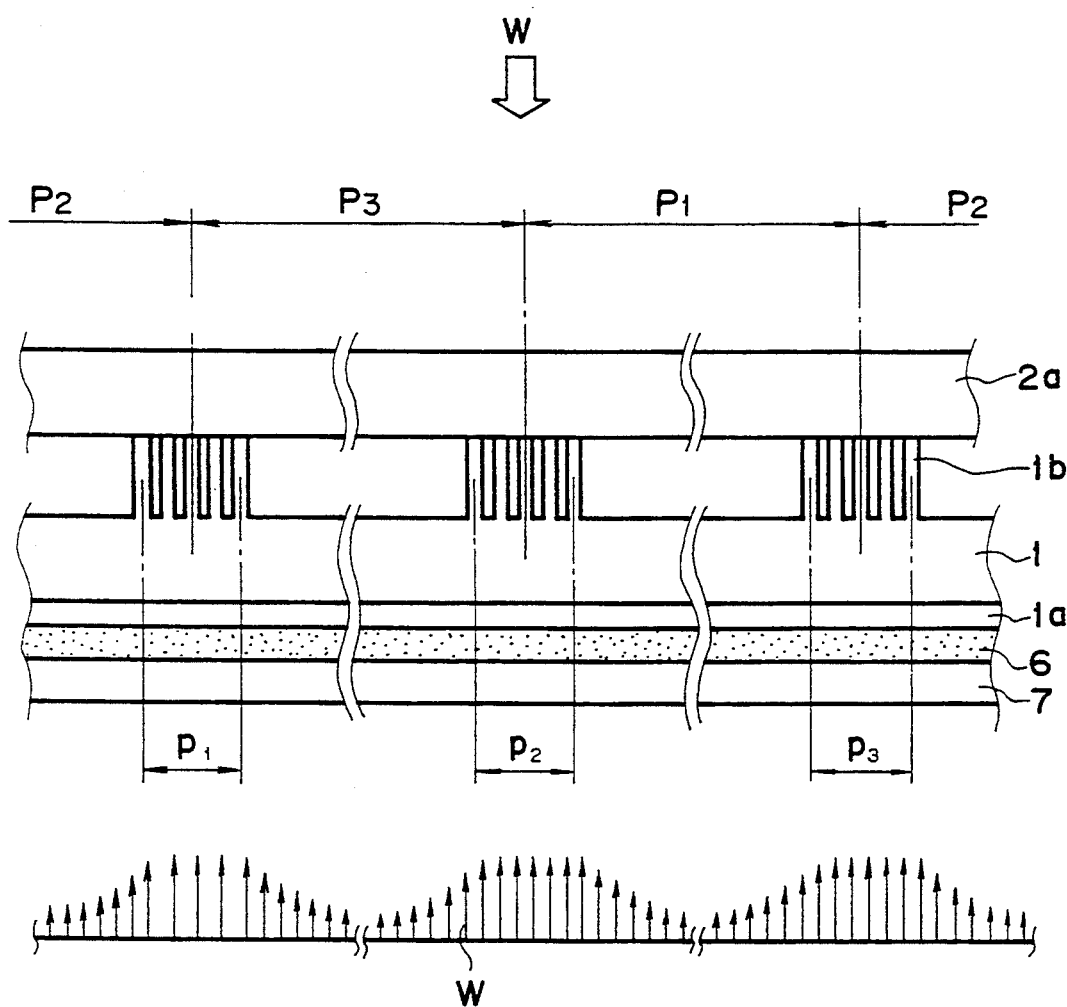
FIG. 3A is a chart showing an urging force distribution in an elastic member of the motor shown in FIG. 1.

FIG. 3A shows an urging force distribution state obtained when a moving member 2 such as the frictional member 2a is entirely urged against the elastic member 1 with the above-mentioned shape by an urging force W.

FIG. 3A is a circumferentially developed view of the vibration member 1. An urging force is distributed on the upper surface (driving side) of the elastic member 1, so that an urging force on the projection groups is larger than that on the remaining surface portion, and is a uniform surface pressure (w) in each projection group. This state almost remains the same at relative positions in the circumferential direction.

This is because the elastic member 1 and the frictional member 2a are in contact with each other at only the projection groups at a plurality of positions (three positions in this embodiment) in their circumferential direction. As compared to the prior art, the projections 1b can reliably be in contact with the frictional member 2a.

Therefore, even if the elastic member 1 and the frictional member 2a have a poor flatness, the frictional member 2a can reliably contact the elastic member 1 as long as a given flatness of the projections 1b constituting the projection groups is maintained.

Figure 3B:
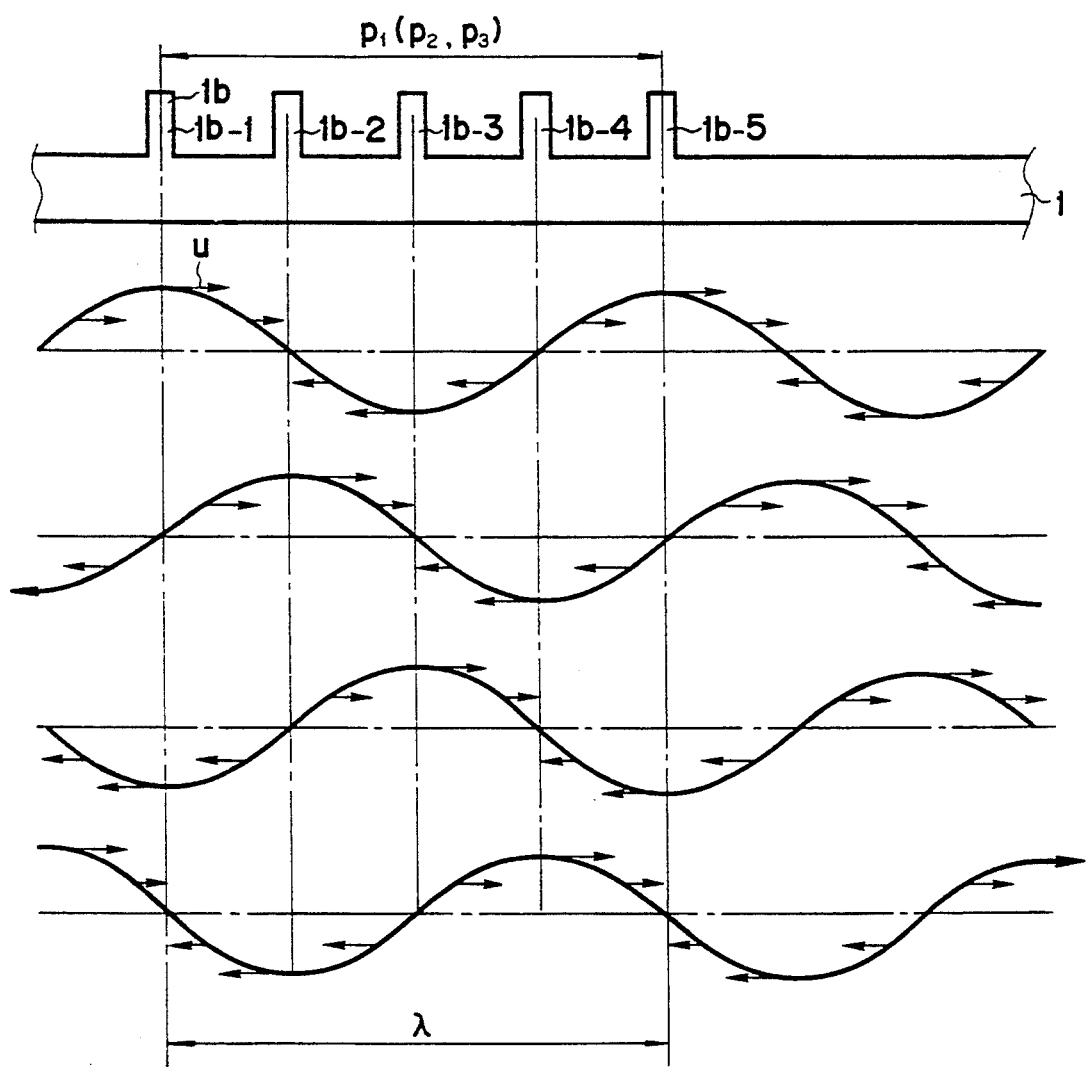
FIG. 3B is a chart showing the relationship between transition states of a travelling wave and positions of projections.

On the other hand, as shown in FIG. 3B, the circumferential pitches $P_1$, $P_2$, and $P_3$ of the projection groups are equal to the wavelength $\lambda$ of a travelling wave formed in the elastic member 1. This is because it is optimal to cause the circumferential pitch to coincide with the wavelength $\lambda$ due to a transition state of a wave.

More specifically, as shown in FIG. 3B, ⓐ to ⓓ represent waveforms of a travelling wave formed in the surface of the elastic member 1, and changes in velocity component u as a function of time in a travelling direction. Upon repetitions of ⓐ→ⓑ→ⓒ→ⓓ→ⓐ, phases of waves are shifted by $\lambda/4$, and the velocity component u is maximized at peaks of the waves. Therefore, assuming an ideal form wherein the frictional member 2a and the elastic member 1 contact each other at only peaks of the waves, the projections are brought into contact with the frictional member 2a in the order of projections 1b-1 (at an end side in each projection group)→1b-2→1b-3→1b-4 in turn upon transition of waves ⓐ→ⓓ, thereby attaining a frictional driving operation.

In this case and a smooth feed operation cannot be performed during a period of $\lambda/4$, a driving loss occurs. If the number of projections in each projection group is increased, a smoother driving operation can be assured.

For this reason, since the feed operation can become smoother as the number of projections in each projection group is increased, if each projection group is formed by one projection, a smooth feed operation can be continuously attained. Therefore, in the circumferential pitches $P_1$, $P_2$, and $P_3$, at least one point can effectively contribute to a driving operation.

Since a contact state between planes can be stabilized at three points, since a three-position contact state is adopted like in this embodiment, a stable contact state can be assured regardless of the pitches $P_1$, $P_2$, and $P_3$ between adjacent projection groups.

In this embodiment, the circumferential pitches $P_1$, $p_2$, and $P_3$ coincide with the wavelength $\lambda$, but may have an approximate value.

Figure 4:
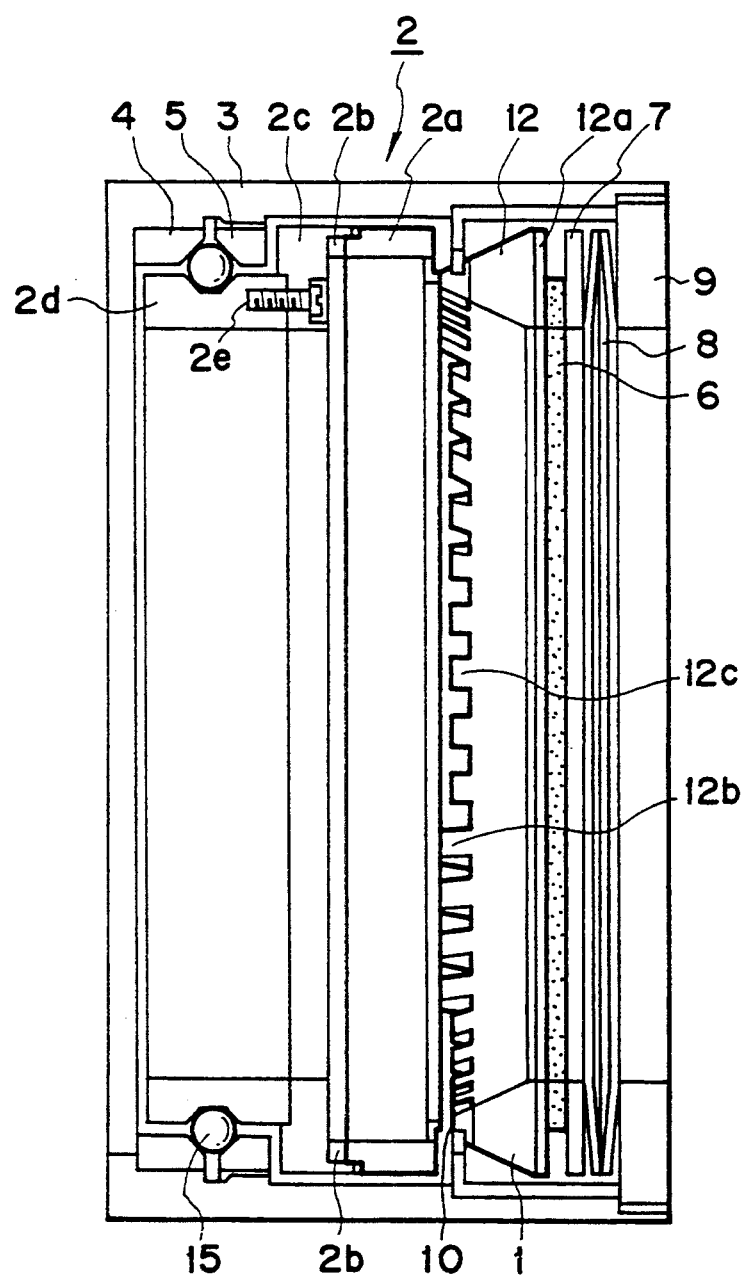
FIG. 4 is a sectional view showing a motor according to another embodiment of the present invention.
Figure 5:
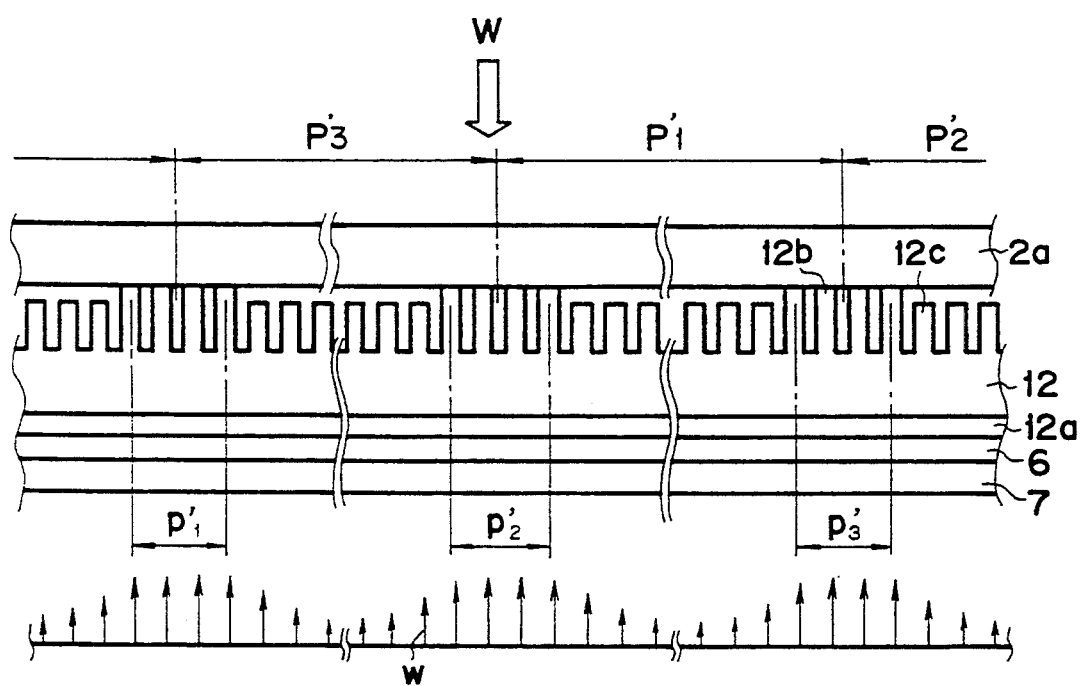
FIG. 5 is a chart showing an urging force distribution of an elastic member of the motor shown in FIG. 4.
Figure 6:
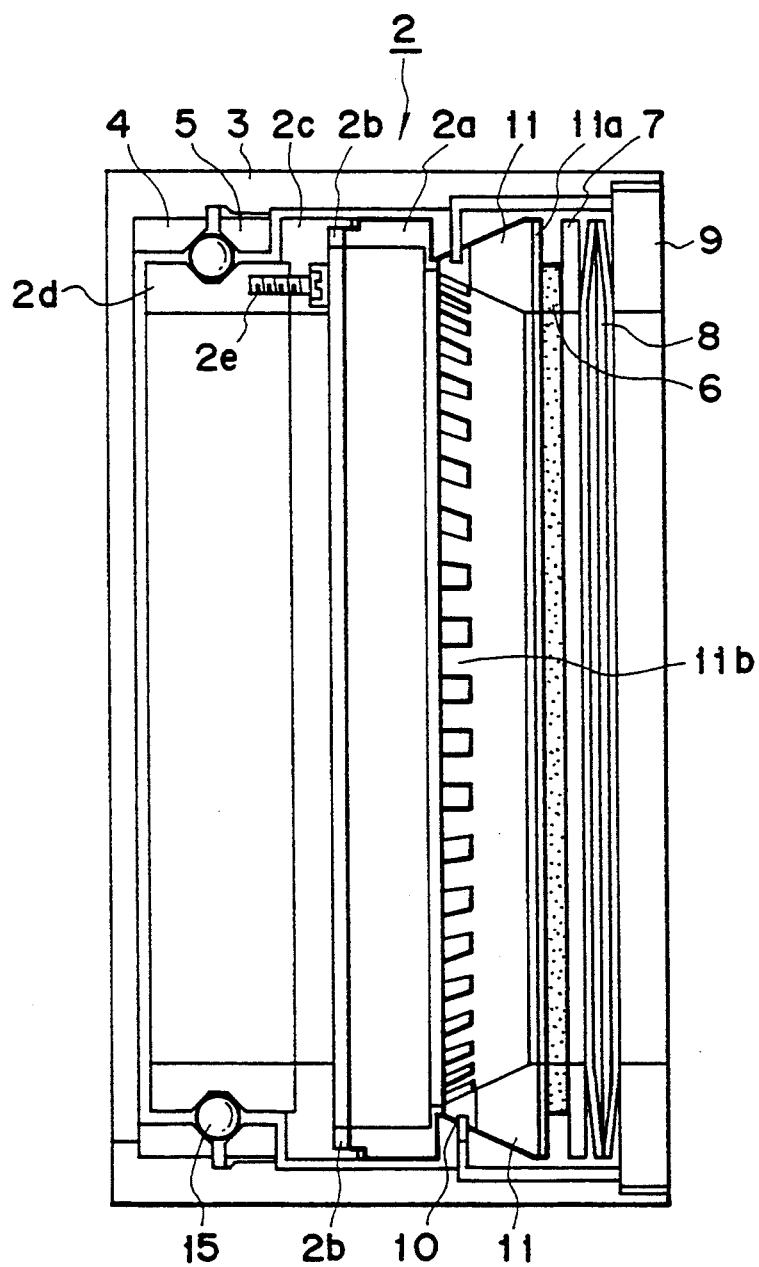
FIG. 6 is a sectional view of a conventional vibration wave motor.

FIG. 4 is a sectional view showing a vibration wave motor according to another embodiment of the present invention, and FIG. 5 is a circumferentially developed view showing an urging force distribution state of the motor shown in FIG. 4. In this embodiment, piezo-electric elements 12a as electro-mechanical energy conversion elements are adhered on the bottom surface of an elastic member 12 like in the prior art. A plurality of projections 12b and 12c are formed on the upper surface (driving side) of the elastic member 12 along its circumferential direction. In the projections 12b and 12c, several long projections 12b are formed within a circumferential pitch $p_1'$ ($p_2'$ and $P_3'$) to form a projection group, and are in contact with a frictional member 2a. A plurality of groups of these projects are arranged at several positions to be separated at long circumferential pitches $P_1'$ ($P_2'$ and $P_3'$). As a result, these plurality of projection groups are in contact with the frictional member 2a, thereby driving the frictional member 2a.

A plurality of short projections 12c are formed to fill intervals between the projection groups consisting of the plurality of long projections 12b. Each projection 12c has a sufficiently short end so as not to contact with the frictional member 2a. Therefore, when the entire structure is pressed by an urging force W by a belleville spring 8, even if the elastic member 12 and the frictional member 2a have a poor flatness, the projections 12b can reliably be in contact with the frictional member 2a since there are only several contact points between the elastic member 12 and the frictional member 2a. The short projections 12c do not contact the frictional member 2a at all.

Arrows w represent a circumferential distribution of an urging force applied to the elastic member 12. This distribution state almost remains the same at circumferential opposing positions between the elastic member 12 and the frictional member 2a.

In this embodiment, since the plurality of projections 12b and 12c are formed over the entire surface, the elastic member 12 can be smoothly vibrated to have a high continuity in the circumferential direction, as compared to the above-mentioned embodiment.

In each of the above embodiments, a ring type motor has been exemplified. The same effect as described above can be obtained when the present invention is applied to a vibration motor having an elliptic vibration member.

As described above, according to the present invention, when a contact portion between an elastic member and a contact member contacting the elastic member is limited to several positions in a circumferential direction of a vibration member, in other words, in a travelling direction of a travelling vibration wave, a reliable and stable contact state can be assured. For this reason, if two contact surfaces have a poor flatness, a rotation nonuniformity can be eliminated, and generation of noise can also be suppressed.

What is claimed is:

1. A vibration wave driven apparatus, comprising:
   an elastic member having at least a driving side, and a plurality of contact portion groups formed on a portion of the driving side at predetermined pitches, each of said contact portion groups including a plurality of projections arranged at predetermined intervals different from the predetermined pitches;
   a contact member arranged for frictional contact with said plurality of contact portion groups; and
   an electro-mechanical energy conversion element provided on said elastic member and for generating a travelling vibration wave in said elastic member in response to an applied electrical signal, whereby the vibration wave causes relative movement between the elastic member and the contact member.

2. An apparatus according to claim 1, wherein each of said contact portion groups comprises a plurality of projections formed along a travelling direction of the travelling vibration wave.

3. An apparatus according to claim 2, wherein a projection shorter than each of the projections of each of said contact portion groups is formed between the adjacent contact portion groups on the driving side of said elastic member along the travelling direction of the travelling vibration wave.

4. An apparatus according to claim 2, wherein a plurality of projections, each being shorter than each of the projections of each of said contact portion groups, are formed between the adjacent contact portion groups on the driving side of said elastic member along the travelling direction of the travelling vibration wave.

5. An apparatus according to claim 4, wherein said elastic member is a ring-shaped member.

6. A vibration driven motor, comprising:
   an elastic member having at least a driving side, and a plurality of contact portion groups formed on a portion of the driving side at predetermined pitches, each of said contact portion groups including a plurality of projections arranged at predetermined intervals different from the predetermined pitches; and
   an electro-mechanical energy conversion element provided on said elastic member and for generating a vibration in said elastic member in response to an applied electrical signal, whereby the vibration causes relative movement between a member in frictional contact with said contact portion groups of said elastic member and said elastic member.

7. A motor according to claim 6, wherein said elastic member is a ring-shaped member.

8. A vibration driven member for a vibration driven motor, comprising:
   an elastic member having at least a driving side, and a plurality of contact portion groups formed on a portion of the driving side at predetermined pitches, each of said contact portion groups including a plurality of projections arranged at predetermined intervals different from the predetermined pitches; and
   an electro-mechanical energy conversion element provided on said elastic member and for generating a driving vibration in said elastic member in response to an applied electrical signal, whereby the driving vibration creates relative movement between the elastic member and a contact member in frictional contact with the elastic member to receive the driving vibration from each of the contact portion groups.

9. A vibration member according to claim 8, wherein each of the pitches is equal.

10. A vibration member according to claim 8, wherein the number of said contact portion groups is three.

11. A vibration member according to claim 10, wherein each of said contact portion groups includes five projections.

12. A vibration member according to claim 8, wherein said driving vibration is a travelling wave and each of said pitches is set substantially equal to the wave length of the travelling wave.

13. A vibration wave driven device, comprising:
   an elastic member having a plurality of contact projection groups arranged at predetermined pitches, each of said contact projection groups including a plurality of projections arranged at predetermined intervals different from the predetermined pitches, the elastic member generating a travelling wave in response to an applied electrical signal; and
   a contact member provided in frictional contact with each of the plurality of contact projection groups to receive the travelling wave, whereby the travelling wave creates relative movement between the elastic member and the contact member.

14. A vibration driven device, comprising:
   an elastic member having a plurality of contact projection groups arranged at predetermined pitches, each of said contact projection groups including a plurality of projections arranged at predetermined intervals different from the predetermined pitches, the elastic member generating a vibration therein in response to an applied electrical signal; and
   a contact member provided in frictional contact with each of the plurality of contact projection groups to receive the vibration, whereby the vibration creates relative movement between the elastic member and the contact member.

* * * * *

UNITED STATES PATENT AND TRADEMARK OFFICE
CERTIFICATE OF CORRECTION

PATENT NO. : 5,402,030
DATED : March 28, 1995
INVENTOR(S) : HITOSHI MUKOHJIMA

It is certified that error appears in the above-indentified patent and that said Letters Patent is hereby corrected as shown below:

On title page,

<u>At [56] Foreign Patent Documents</u>

```
"0136985  6/1988  Japan
 0190569  8/1988  Japan
 0107678  4/1989  Japan
 0218367  8/1989  Japan
 0070277  3/1990  Japan" should read --63-136985  6/1988  Japan
  63-190569  8/1988  Japan
   1-107678  4/1989  Japan
   1-218367  8/1989  Japan
   2-70277   3/1990  Japan--
```

<u>Column 3</u>

Line 65, "and" should read --as--.

Signed and Sealed this

Twenty-seventh Day of June, 1995

Attest:

BRUCE LEHMAN

Attesting Officer     Commissioner of Patents and Trademarks